United States Patent [19]

Laborde

[11] 4,142,813
[45] Mar. 6, 1979

[54] SADDLE CARRIAGES

[75] Inventor: Jean E. Laborde, Arudy, France

[73] Assignee: Les' Usines Laprade, Arudy, France

[21] Appl. No.: 876,744

[22] Filed: Feb. 10, 1978

Related U.S. Application Data

[63] Continuation of Ser. No. 664,274, Mar. 5, 1976, abandoned.

[30] Foreign Application Priority Data

Mar. 10, 1975 [FR] France .............................. 75 07348
Dec. 3, 1975 [FR] France .............................. 75 36933

[51] Int. Cl.² ............................................. B25G 3/36
[52] U.S. Cl. ................................... 403/391; 403/191; 403/87
[58] Field of Search ............................ 403/386–391, 403/233–237, 191, 87, 403, 97, 407, 98, 110, 116, 280–282; 297/195

[56] References Cited

U.S. PATENT DOCUMENTS

| 507,413 | 10/1893 | Broadbent | 403/390 |
|---|---|---|---|
| 3,480,306 | 11/1969 | Hsu | 403/281 |
| 3,992,054 | 11/1976 | Compagnolo | 403/87X |

FOREIGN PATENT DOCUMENTS

| 2514601 | 10/1975 | Fed. Rep. of Germany | 297/195 |
|---|---|---|---|
| 1180682 | 1/1959 | France | 403/87 |
| 646602 | 10/1962 | Italy. | |

Primary Examiner—Wayne L. Shedd
Attorney, Agent, or Firm—Finnegan, Henderson, Farabow & Garrett

[57] ABSTRACT

A saddle carriage is provided which is designed to fit onto a cycle stem and carry a saddle. The carriage comprises a support which can be secured to the cycle stem, the support having an upwardly concave, substantially horizontal, cylindrical sector which, in use, overhangs laterally relative to the stem. Superimposed upper and lower jaws are provided for gripping portions, e.g. wires of the saddle, the lower jaw having a lower surface which conforms to the cylindrical sector of the support. A nut and bolt or the like are provided for holding the jaws together, and the lower jaw or the support has a slot which permits relative displacement of the lower jaw and the support despite the presence of the bolt.

15 Claims, 10 Drawing Figures

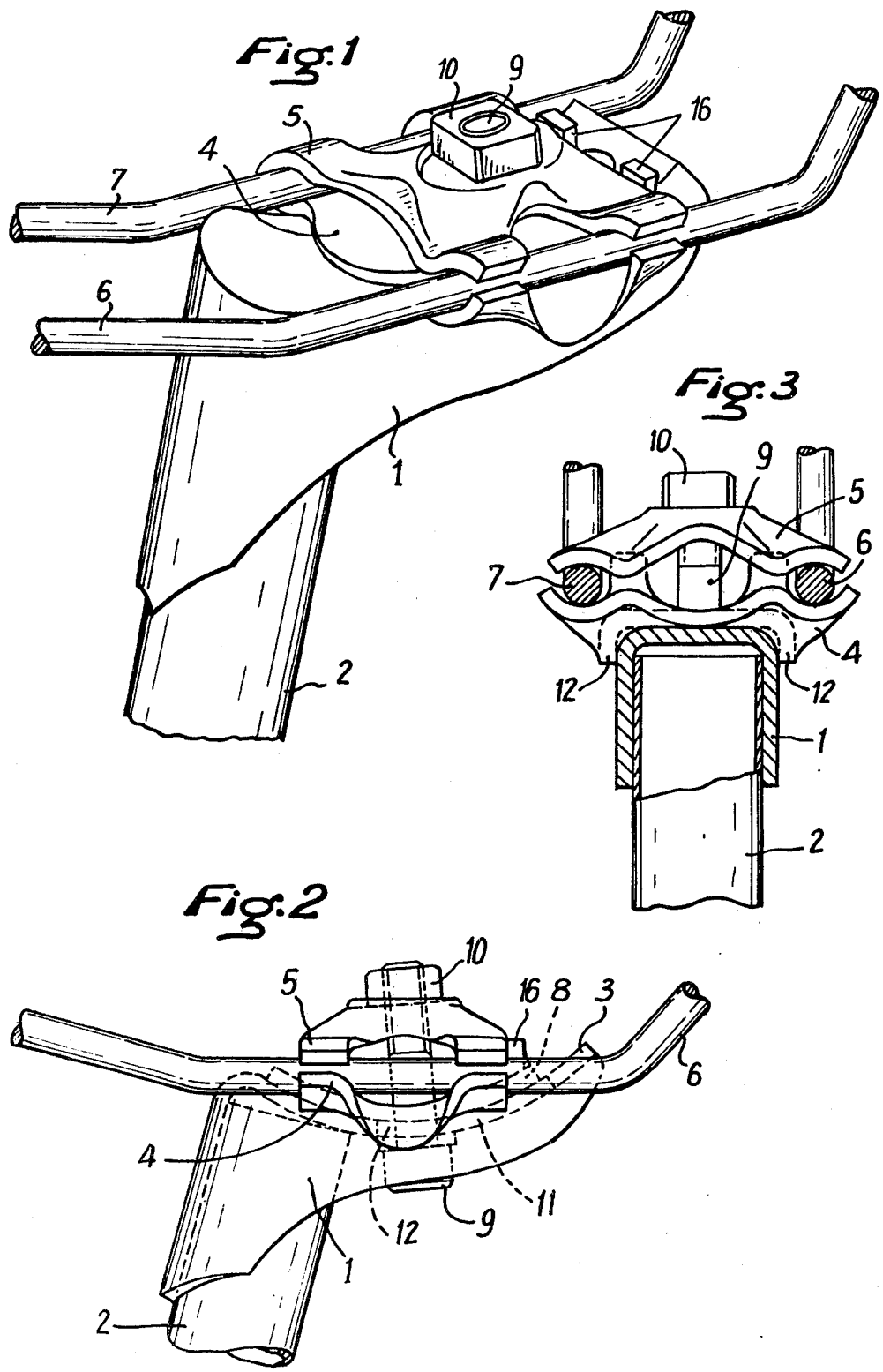

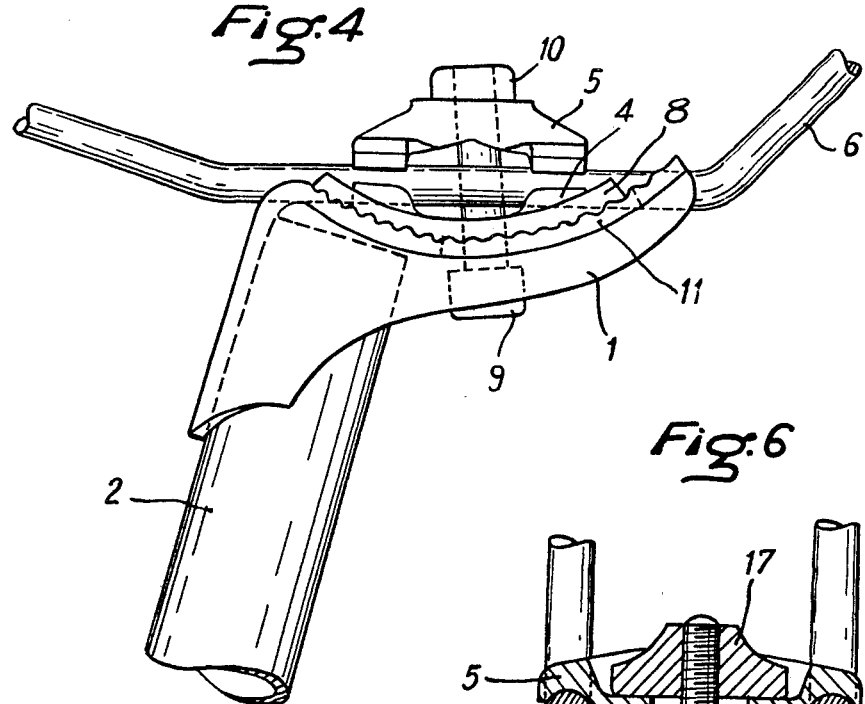
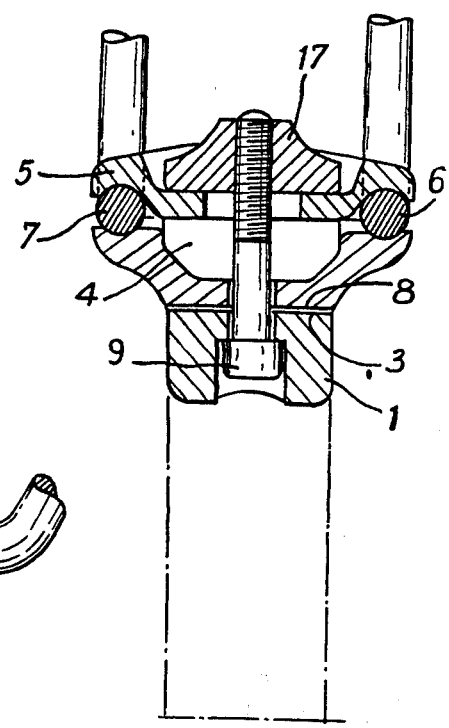
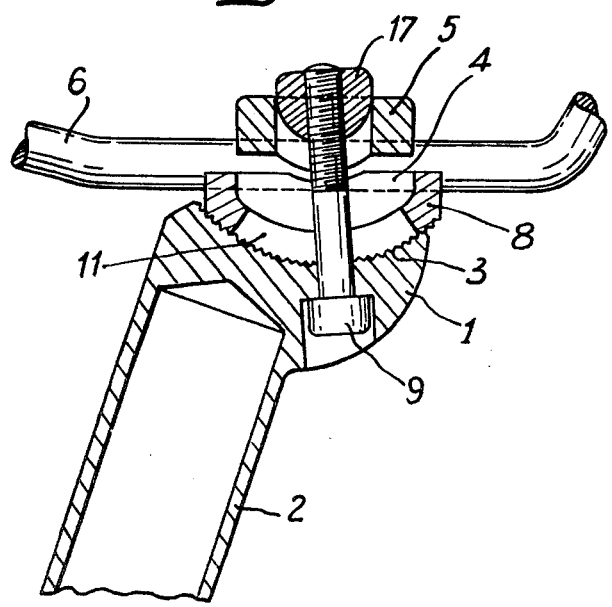

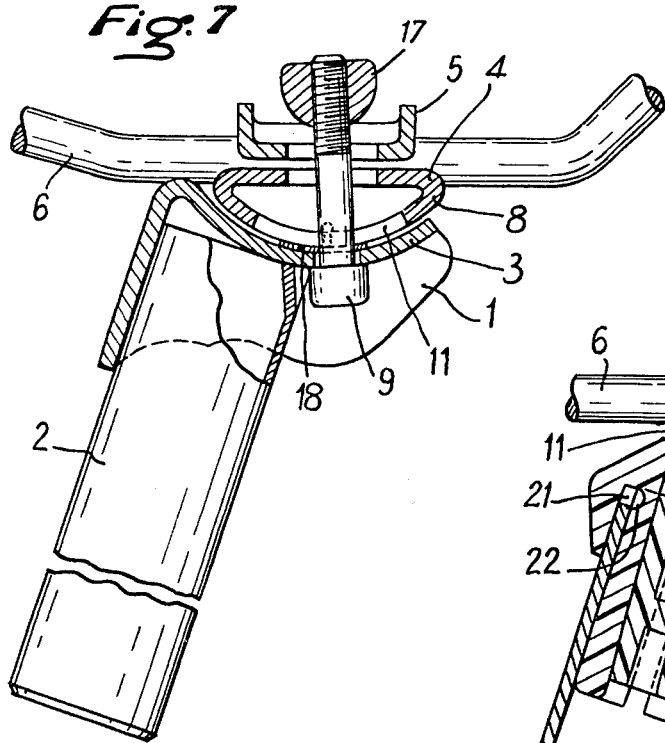
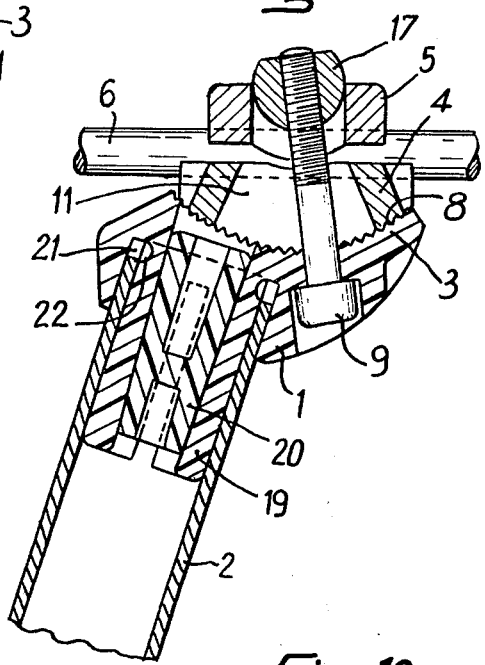
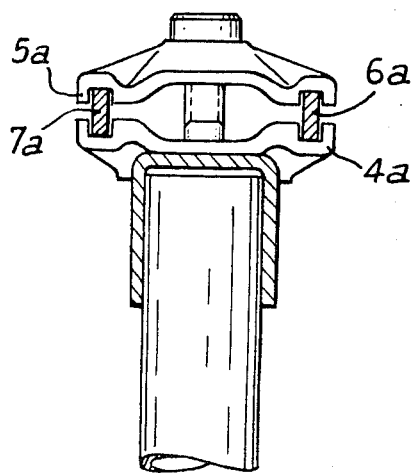
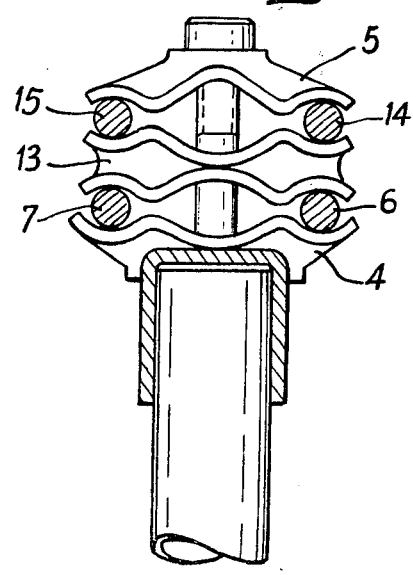

SADDLE CARRIAGES

This is a continuation of application Ser. No. 664,274, filed Mar. 5, 1976 now abandoned.

BACKGROUND OF THE INVENTION

This invention relates to a saddle carriage. The mounting of a bicycle saddle on its stem is generally accomplished by means of a carriage having a plurality of locking bolts to permit adjustment of the position of the saddle forwardly, backwardly and in regard to its inclination.

The head of the stem is generally swaged to prevent the saddle sliding down it and the carriage is in itself an assembly which is complicated to such an extent that it is generally supplied with the saddle, fitted in advance, and its adjustment requires much manipulation. The result is a relatively high cost price and inconvenience in fitting and adjusting.

SUMMARY OF THE INVENTION

An object of the invention is to provide a saddle carriage from which these disadvantages have been eliminated, i.e., a saddle carriage which is easy to fit on to a saddle, can be fitted on to saddles of various types, and is easy to adjust and lock.

According to the invention there is a saddle carriage comprising a support adapted to be secured to a cycle stem, the support having an upwardly concave, substantially horizontal, cylindrical sector which overhangs laterally relative to the stem; superimposed upper and lower jaws for gripping portions of the saddle, the lower jaw having a sector with a lower surface which conforms to the said cylindrical sector of the support; and screw means holding the jaws together, at least one of the said cylindrical sectors defining a slot to permit the relative displacement of the sectors despite the presence of the screw means.

The above mentioned screw means may comprise a bolt which runs from bottom to top, crosses the overhanging part of the support, laterally to the saddle stem, then the two jaws, and has its upper end received in a threaded member connected to the upper jaw.

A single bolt or screw is sufficient to effect the adjustment (forward, backward and inclination) and the locking in position of the saddle and this screw is located in an easily accessible place under the saddle.

By simply changing the jaws, the system according to the invention can equally be adapted both to two-wire saddles and saddles mounted on flat iron bars or on four wires.

Some preferred features of certain forms of the invention are as follows:

1. The contact surfaces of the cylindrical sectors are provided with roughness obtained by any suitable means, for example, sandblasting, shotblasting, machining, casting and die forging.
2. Between the contact surfaces of the cylindrical sectors there is interposed a strip of material having on each of its faces a surface with a high coefficient of friction.
3. The support and the lower jaw comprise lateral walls which work together in such a way as to prevent their relative lateral displacement.
4. The radius of curvature of the cylindrical sectors is between 20 mm and 300 mm approximately. 5. The thread for fixing the screw or bolt is fixed in the upper jaw and the cylindrical sector of the support comprises a slot at right angles to its generatrices so as to permit the clearance of the screw, and the relative displacement of the lower jaw and the support.
6. The thread for fixing the screw is provided in a threaded member mounted for pivotal movement on the upper jaw about an axis parallel to the generatrices of the cylindrical sectors, the lower jaw comprises a slot at right angles to the said generatrices to permit its relative movement in relation to the support despite the presence of the screw or bolt and the head of the screw or bolt is in fixed position in the support.
7. The end of the saddle stem is provided with a water tight cap.
8. The lower shell-shaped support is made of plastic and is moulded from two parts. One part includes a sleeve, slightly conical on the outside, so that it can be inserted into stems of different diameters, and provided on the inside with a frusto-conical axial bore. The second part is conical cap which is inserted by force into the said sleeve, the end of the stem being provided with indentations which are designed to prevent any rotation of the support relative to the stem. At the junction of the sleeve and the shell, the support may comprise a groove in which the end of the saddle stem is pushed and the bottom of this groove comprises an annular recess which permits the end of the saddle stem pushed in by force to be deformed into the said recess.
9. A locking device prevents the relative displacement of the jaws parallel to the wires of the saddle.

BRIEF DESCRIPTION OF THE DRAWINGS

FIG. 1 is an overall perspective view of a first embodiment of the invention.

FIG. 2 is a side view of the embodiment of FIG. 1.

FIG. 3 is a front view, partially, in section of the same embodiment.

FIG. 4 is a side view of a second embodiment.

FIG. 5 is a view in longitudinal section of a third embodiment variant.

FIG. 6 is a transverse section of the embodiment of FIG. 5.

FIG. 7 is a view in section along the axis of the stem showing a modification of the embodiment of FIGS. 5 and 6 in a metal such as steel.

FIG. 8 is a similar view showing an embodiment with a plastic support.

FIGS. 9 and 10 show schematically the adaptation of the carriage of the invention to other saddles than the saddle of the preceding Figures having two wires.

DESCRIPTION OF THE PREFERRED EMBODIMENT

The saddle carriage according to the invention as illustrated in the drawings comprises a support 1 which is integral with the stem 2 and provided with a substantially horizontal, upwardly concave cylindrical sector 3 which is arranged overhanging relative to the saddle stem.

On the cylindrical sector 3 is disposed an assembly of two superimposed jaws 4 and 5 which grip saddle wires 6 and 7. The lower surface of the lower jaw 4 has a cylindrical section 8 formed so as to fit the sector 3.

The assembly is held together by a single bolt 9 passing from bottom to top through the support 3 and the jaws 4 and 5 and received in a threaded member 10 connected to the jaw 5, for example a nut welded to the jaw 5 (FIGS. 1 to 4). Alternatively the bolt may be received in a threaded pivotal member 17 (FIGS. 5 and 6).

A slot 11 provided on at least one of the sectors 3 and 8 permits relative movement thereof before tightening. In FIGS. 1 to 4, this slot is provided in the sector 3 and the bolt 9 changes the inclination according to the setting. In FIGS. 5 and 6 this slot is provided in the sector 8 and the member 17 whose ends rest in recesses in the upper jaw 5 changes the orientation in relation to the jaw 5.

In the embodiments of FIGS. 1 to 3 and FIG. 4, the jaw 4 has a laterally flared portion 12 which co-operates with the sides of the support 1 and prevents any relative lateral movement of the jaws in relation to the support.

In the embodiments of FIG. 4 and FIGS. 5 and 6, the cylindrical sectors 3 and 8 are undulated in the form of teeth which interlock with one another and ensure better locking of the inclination of the saddle.

The radius of curvature of the cylindrical sectors is preferably between 20 mm and 300 mm approximately.

The fixing of the support 1 on the stem 2 may be accomplished in various ways, for example by force fitting or by welding (FIG. 1), by bolting, by resilient clamping using split collar or by forming the support 1 integrally on the head of the stem (FIG. 5).

In FIG. 7, the support 1 fitted to the stem 2 and provided with the cylindrical sector 3 is fitted in water tight manner to the top of the stem 2. The support 1 is provided with a lateral hole for the passage of the screw 9 which is screwed in a member 17 mounted pivotally on the upper jaw 5 and parallel to the generatrices of the sectors 3 and 8. The lower jaw 4 has a slot 11 extending at right angles to the said generatrices for the clearance of the screw 9.

The surfaces of the cylindrical sectors 3 and 8 are smooth and a strip 18 is interposed having on each of its faces a surface with a high coefficient of friction. The tightening of the screw 9 then suffices to keep the saddle in position.

Instead of providing undulations or a frictional strip the contact surfaces of the sectors 3 and 8 may be roughened, for example by sandblasting, shotblasting, forming or machining. In the example of FIG. 8 the support 1 is of a relatively plastic material (e.g. plastic or aluminium) and is forced on to the stem 2. This solution has the advantage of allowing the production of the support 1 in such a way as to be adaptable to several saddle stem diameters, in practice from 26 mm to 27.2 mm.

The support 1 consists of two parts. One of these parts is the support 1 as such, and is extended by a sleeve 19, which is slightly conical so as to permit its insertion into stems of different diameters. The sleeve 19 is provided with a conical, axial, internal bore into which the other part, a frusto-conical cap 20, is inserted. The cap is forced into the sleeve 19 which is sealed at the same time as it forces the outside wall of the sleeve 19 against the stem 2.

The support 1 is forced on to the stem 2 whose end is provided with indentations 21 in the form of rectangular notches or triangular teeth, which sink into the plastic and prevent any rotation of the support 1 (and of the saddle) about the stem 2.

The device of FIG. 8 can also be constructed with a support 1 of a very hard material such as steel. In this case the groove defined between the sleeve 19 and the skirt formed by the lower part of the support 1 advantageously ends in an annular recess 22. When the stem 2 is forced on to the support 1, its extremity is deformed to occupy at least partially the recess 22 and is thus crimped in the support 1.

FIG. 9 shows a modification for saddles with flat iron bars. It is sufficient to replace the jaws 4 and 5 of the preceding Figures by jaws 4a and 5a shaped to engage the flat iron bars 6a and 7a.

FIG. 10 shows a modification for saddles having four wires. In this case it is sufficient to place between the jaws 4 and 5 a cross piece 13 which fills the space between the wires 6 and 14 on the one hand and 7 and 15 on the other hand.

Of course the various arrangements of the invention can be replaced by technical equivalents.

Thus, instead of using the lateral faces 12 to effect longitudinal guiding, one can use corresponding deformations of the two sectors 3 and 8 in a plane at right angles to the generatrices and capable of relative sliding (tongue and groove for example).

Similarly, the illustrated nut and bolt may be replaced by a screw, a screw and nut, a hollow-head screw, a tubular screw, a rapid locking stem using an eccentric or cams, levers etc., or other similar tightening means.

When the bolt or other tightening means acts in a direction not at right angles to the wires or bars of the saddle it is preferable to provide at least one stop 16 (see FIG. 2) or the equivalent inhibiting the relative movement of the two jaws, parallel to these wires, during tightening.

The member 17 (FIG. 5) may, instead of resting simply by its ends in the notches of the upper jaw 5, pass through a lateral bore.

The stem of the bolt 9 may be integral with the member 17 and tightening may be effected by a nut at the other end of the bolt.

It is preferable that stress should be transmitted directly to the stem 2 and approximately along its axis; for this reason FIGS. 5 to 8 constitute preferred solutions, as dose any solution in which the assembly of the two jaws is located approximately in the axis of the stem and rests directly on the upper end thereof.

The saddle carriage of the invention can be applied to cycles of all kinds, for example bicycles, tricycles, mopeds and motorcycles.

I claim:

1. A saddle carriage of the cradle and jaw type comprising an integral support and stem, said support provided with a substantially horizontal, upwardly concave, cylindrical sector overhanging laterally in relation to said stem, said support having placed thereon an assembly of upper and lower jaws adapted to encompass saddle wires of a saddle, the lower jaw being formed at its lower end with a convex, cylindrical sector complementary to the cylindrical sector of the support, a single screw for longitudinal movement only, disposed laterally relative to said stem, and extending upwardly through openings in said support and jaw assembly from bottom to top for fastening said jaw assembly to said support, and a fastening member on the upper jaw for securing said screw at its top end, and wherein said convex, cylindrical sector of said lower jaw has an enlarged opening therein through which said screw passes for allowing a change of position of said jaw assembly relative to said support without lateral movement of said screw.

2. A carriage according to claim 1, wherein said cylindrical sectors have roughened contact surfaces.

3. A carriage according to claim 1, wherein between adjacent surfaces of the cylindrical sectors there is interposed a strip of material having on each of its faces a surface with a high coefficient of friction.

4. A carriage according to claim 1 wherein the support and the lower jaw comprise side walls which co-operate to prevent their relative lateral displacement.

5. A carriage according to claim 1, wherein the radius of curvature of the cylindrical sectors is between 20 mm and 300 mm approximately.

6. A carriage according to claim 1 wherein said screw comprises a generally upwardly directed bolt having a head portion positioned in said support and a threaded top end portion, and said fastening member comprises an internally threaded member fastened to the top end of said bolt and mounted pivotally on the upper jaw for pivotal movement about an axis parallel to the generatrices of the cylindrical sectors, the lower jaw defining said enlarged opening at right angles to the generatrices to permit its displacement in relation to the support despite the presence of said bolt.

7. A carriage according to claim 1, wherein the end of the saddle stem is provided with a water tight cap.

8. A carriage according to claim 1, wherein the said support comprises a first part having a generally tubular portion whose exterior is slightly frusto-conical and whose interior defines a frusto-conical bore, and a second part in the form of a frusto-conical member sized for force fitting in the said frusto-conical bore.

9. A carriage according to claim 1 wherein the support comprises a steel sleeve sized for force fitting into the stem and an external skirt defining a groove which ends in an annular recess.

10. A carriage according to claim 1 wherein said upper jaw has an upper face formed in a cylindrical cup shape and wherein said fastening member has a lower portion shaped complementary to said cylindrical cup and pivotally mounted in said cup for allowing engagement with said cup during various positions of said jaw assembly relative to said support when said screw is tightened.

11. A carriage according to claim 10 wherein said screw has a threaded top end and wherein said fastening member has an internally threaded portion threadably engaged with said top end of said screw.

12. A saddle carriage of the cradle and jaw type comprising:
   (a) an integral support and stem, said support having a substantially horizontal, upwardly concave cylindrical sector overhanging laterally in relation to said stem;
   (b) an assembly of upper and lower jaws adapted to encompass saddle wires of a saddle, said lower jaw being formed at its lower end with a convex, cylindrical sector complementary to said cylindrical sector of said support;
   (c) a single screw extending upwardly through openings in said support and jaw assembly from bottom to top for fastening said jaw assembly to said support and disposed laterally relative to said stem, wherein said opening of said lower jaw sector through which said screw passes is enlarged for allowing a change of position of said jaw assembly relative to said support without lateral movement of said screw; and
   (d) a fastening member pivotally mounted on said upper jaw and secured to said screw at its top end for locking engagement with said upper jaw during various positions of said jaw assembly relative to said support when said screw is adjusted 13. The carriage according to claim 12, wherein said upper jaw has an upper face formed in a cylindrical cup shape and wherein said fastening member has a lower portion shaped complementary to said cylindrical cup and pivotally mounted in said cup for allowing locking engagement with said cup during various positions of said jaw assembly relative to said support when said screw is adjusted.

14. The carriage according to claim 13, wherein said screw has a threaded top end and wherein said fastening member has an internally threaded portion threadably engaged with said top end of said screw.

15. The carriage according to claim 14, wherein said screw has a head portion positioned in said support and adjustable for engaging and disengaging said lower portion of said fastening member against said upper face of said upper jaw.

* * * * *